United States Patent
Butscher et al.

[11] Patent Number: 6,150,785
[45] Date of Patent: Nov. 21, 2000

[54] METHOD FOR CONTROLLING THE CLOSING PROCESS OF CLOSING DEVICES WITH AT LEAST ONE PART MOVED BY AN ELECTROMOTOR

[75] Inventors: Karlheinz Butscher, Langenargen; Dieter Driendl, Deggenhausertal; Walter Ulke, Friedrichshafen, all of Germany

[73] Assignee: Temic Telefunken Microelectronic GmbH, Heilbronn, Germany

[21] Appl. No.: 09/214,300

[22] PCT Filed: Apr. 29, 1998

[86] PCT No.: PCT/EP98/02524

§ 371 Date: Jun. 14, 1999

§ 102(e) Date: Jun. 14, 1999

[87] PCT Pub. No.: WO98/50992

PCT Pub. Date: Nov. 12, 1998

[30] Foreign Application Priority Data

May 2, 1997 [DE] Germany .................. 197 18 631

[51] Int. Cl.[7] ........................................ G05B 5/00
[52] U.S. Cl. .................. 318/468; 318/282; 49/26
[58] Field of Search ........................ 318/282, 446, 318/447, 466, 468, 469, 630; 49/26, 28

[56] References Cited

U.S. PATENT DOCUMENTS

| | | | |
|---|---|---|---|
| 4,471,274 | 9/1984 | Ross et al. | 318/282 |
| 5,668,451 | 9/1997 | Driendl et al. | 318/466 |
| 5,689,160 | 11/1997 | Shigematsu et al. | 318/281 |

FOREIGN PATENT DOCUMENTS

| | | |
|---|---|---|
| 0148318 | 7/1985 | European Pat. Off. . |
| 3346366C2 | 12/1985 | Germany . |
| 3514223A1 | 10/1986 | Germany . |

*Primary Examiner*—David Martin
*Assistant Examiner*—Rina I. Duda
*Attorney, Agent, or Firm*—Venable; George H. Spencer; Norman N. Kunitz

[57] ABSTRACT

Described is a method of controlling the closing process of closing devices having at least one part that is moved by an electric motor, in which, in the startup phase of the closing device, a movement in the opening direction with a specific opening path is first performed immediately after the activation of the closing process, prior to the movement in the closing direction, for assuring jamming protection. This opening path is variably preset by means of an adaptation process involving at least one adaptation step, and at least as a function of a previous actuation process of the closing device.

18 Claims, 1 Drawing Sheet

METHOD FOR CONTROLLING THE CLOSING PROCESS OF CLOSING DEVICES WITH AT LEAST ONE PART MOVED BY AN ELECTROMOTOR

TECHNICAL FIELD

The invention relates to a method of controlling the closing process of closing devices having at least one part that is moved by an electric motor, as is known from DE 33 46 366 C2.

Closing devices having parts that are moved by electric motors are employed in numerous forms for realizing actuation processes (closing processes, opening processes) that are executed by means of an external force—in the example of the field of motor vehicles, for electrical actuation of side windows, sun roofs and sliding doors, or in gate-closing devices (garage doors, rolling gates). To increase user or operator comfort, the actuation processes (particularly the closing processes) are often performed automatically: The user or operator need merely initiate the actuation process, and can focus on other activities while the actuation process runs (fully) automatically.

In automatic closing processes (i.e., in the realization of an automatic function for the closing process), especially automatic closing processes that are not monitored further by the user or operator, or are triggered by remote by the user or operator from a great distance, the risk exists of jamming of body parts or objects. Because of the associated, considerable risk of damage or injury, protection against jamming is prescribed for some closing devices for safeguarding people's well-being—for example, in Germany, in the field of motor vehicles, Guideline No. 43 was drawn up for Paragraph 30 StVZO "Insassenschutz [Passenger Protection]," and in the USA, Standard 571.118 was incorporated into the "National Highway Traffic Safety Administration (NHTSA)." According to these ordinances, automatic closing processes are only permitted with certain (more or less stringent) prerequisites: In particular, the field of application (e.g. power windows and sun roofs of motor vehicles), the maximum-permissible clamping force (e.g. 100 N), the test bodies used for checking the effectiveness of jamming protection (specifically, their characteristics, such as elasticity, spring rate and geometry), and the marginal conditions under which the jamming protection must become effective (in motor vehicles, for example, a withdrawn ignition key and an automatic closing process) must be determined.

For realizing the jamming protection, the closing process of the closing device can be monitored either directly or indirectly:

In the direct method, the closing space itself is monitored for potential impediments (for example, through the mounting of switching blocks at the closing edge, or through optical monitoring), which is associated with high costs.

In the indirect method, the clamping force arising during jamming is determined, either directly (which is fairly costly because of the necessary sensors, for example force or torque sensors), or indirectly through the detection and evaluation of the measured values of at least one motor variable that is characteristic for the stress of the electric motor (for example through the evaluation of the drive rpm and/or the current consumption, and/or the power consumption and/or the energy consumption of the electric-motor drive), i.e., through assessment of the effect of the clamping force on the drive of the electric motor (change in drive load).

In this indirect determination of the clamping force (commonly used for cost reasons), however, the absolute measured values of the motor variable should not be used in an evaluation because of their dependency on fluctuations in temperature, signs of aging and series scattering; rather, in a relative evaluation, the instantaneous measured value of the motor variable is evaluated through a comparison with a reference measurement or a plurality thereof (the course of the motor variable or the relative change in the instantaneous measured value of the motor variable is evaluated with respect to a reference value of the same motor variable that precedes it in time or location). If a predetermined limit value (trigger threshold value) is exceeded, an occurrence of jamming is assumed, and a reaction to this is initiated by the closing device (for example, the drive of the electric motor is reversed or the motor current is shut off).

A problem in jamming protection that is realized "indirectly" through the determination of changes in the drive load, however, is the monitoring of the closing process, which is often insufficient, and the resulting inadequate jamming protection in the startup phase of the closing device immediately following the activation of the closing process, that is, when the electric motor starts up, from the first supply with current (from resting drive) to stationary operation (up to stationary running drive), particularly because a considerable closing path is traversed in this starting phase (for example, if a closing path at the closing edge until stationary operation is in the order of magnitude of centimeters in closing processes of power windows and sun roofs). The basis of this insufficient monitoring of the closing process is that, in the startup phase, no reference measurement is present yet, or no suitable reference value is available yet;

because of the inertia of masses of the closing device and the force buildup of the electric motor for overcoming the static-friction moments, changes in the drive load of the electric motor occur; their characteristic is additionally dependent on the past history of the current actuation process. In particular, such closing processes cause problems immediately after opening processes, because in these cases first the drive play of the closing device is compensated ("play compensation"), especially the play of the motor/gear arrangement. Consequently, often no distinction can be made between the increase in stress following a play compensation (i.e., a buildup of force following the play compensation to overcome the static-friction limit) and the increase in stress due to an actual incidence of jamming; in other words, no differentiation is possible between the startup phase of a "normal" closing process (without any incidence of jamming) and an incidence of jamming in the startup phase with—often the same—course of the measured value;

Ordinances having strict conditions often cannot be met; for example, the limit values listed in the NHTSA Standard 571.118 for the maximum permissible clamping force with an activation of the jamming protection occurring exclusively in stationary operation are clearly exceeded.

One option proposed for solving this problem is not to initiate the automatic closing process (the automatic function) of the part moved by an electric motor until a defined closing path has been traversed. A disadvantage of this, however, is that an immediate activation of the automatic function, which is often desired, is not possible in an actuation of the closing process, and that the danger of jamming is not significantly reduced.

A different option for solving this problem—namely, the invention of the generic type according to the aforementioned DE 33 46 366 C2—is to precede the closing process with a brief movement in the opening direction (a short opening process) having a fixed opening path. This short opening process provides an additional path for the part (closing element) moved by an electric motor, within which path the drive can achieve stationary operation without the danger of jamming; in other words, the play compensation and subsequent increase in stress (stress on the mechanical arrangement of the closing device) have already occurred when the part moved by an electric motor reaches its original position, and a suitable reference value is available, as a measured value of the motor variable, for the evaluation. In accordance with DE 33 46 366 C2, in the evaluation of the measured values of the motor current used as a motor variable, the values being dependent on the closing path, it is proposed either to define the opening path using a constant time criterion for the opening process, and deactivate the jamming protection by means of a timing element having a constant duration (a precisely-definable activation time is essential for time-based activations of the jamming protection to avoid erroneous responses such as incorrect recognition or non-recognition of jamming), or not to permit an activation of the jamming protection until the first negative current gradient has occurred in the positive range of the current curve dependent on the motor current (in this case, the evaluation of the motor current must be conceptualized to utilize circuitry for bipolar currents to permit a distinction between positive and negative operating currents, which requires a tremendous outlay for circuitry).

The two methods proposed in DE 33 46 366 C2 give rise to the following problems: On the one hand, the closing devices always have a considerable gear play (for example, following a reversal of the movement direction in the closing-path-dependent current curve of the motor current used as a measured variable, the gear play causes a local current minimum, which often attains the level of the no-load current consumption of the electric motor, between the maximum of the switch-on current and the stationary operating state); on the other hand, the properties of the closing device (e.g. the drive play or the compensation of the drive play when the direction is reversed, or the inherent elasticity) are strongly dependent on series scattering, the properties of the mechanical components of the closing device (e.g. a negligible bias of the cable in cable-drawn lifting mechanisms), the environmental conditions (ambient temperature, etc.) and the operating conditions (effects of aging, etc.), and therefore can experience drastic changes in their characteristic in the startup phase. Consequently, a disadvantage of the two methods proposed in DE 33 46 366 C2 is that, on the one hand, erroneous reactions can be caused and, on the other hand, the (predetermined) opening path for a design commonly used in practice for mass-produced goods must be established with consideration of the unfavorable conditions, taking into account all marginal conditions (i.e., sufficient length)—this "worst-case" value can assume as much as 10% of the maximum closing path—so the drive can be moved unnecessarily long in the opening direction, which greatly delays the automatic function (the closing process) and severely limits the operator's comfort.

SUMMARY OF THE INVENTION

It is the object of the invention to provide a method, which avoids the above-described disadvantages and assures effective jamming protection under all environmental or operating conditions of the closing device without limiting the operator's comfort.

Advantageous embodiments and modifications of the method are the subject of the further claims.

In the described method, to avoid the incidence of jamming in the startup phase, each closing process is preceded by a movement in the opening direction with a variable opening path. In an adaptation process involving at least one adaptation step, the variable opening path is adaptively predetermined—that is, the movement in the opening direction is adaptively adapted to the requirements of the respective closing device (of the respective drive) under consideration of previous actuation processes (especially closing processes) and, preferably, under consideration of ordinances or guidelines to be met and, optionally, under consideration of the startup behavior of the closing device with respect to the play compensation of the drive play. After the predetermined, variable opening path has been traversed, the direction of rotation of the drive is reversed, and a motion is performed in the closing direction; if the closing path traversed in the closing direction attains or exceeds the opening path traversed in the opening direction, the jamming protection is activated.

In a first adaptation step of the adaptation process, to predetermine the variable opening path, once the direction of rotation of the drive (the armature of the electric motor) has been reversed, an absolute or incremental determination of position assesses which closing path will be traversed during the closing process from the point of the reversal of the direction of rotation (from the initial point in the closing direction) until stationary operation is attained. This closing path can be stored, and serves as a preset value for the opening path to be traversed in the opening direction during the next closing process. The preset value determined in this way may be acted upon by an additive, drive-specific offset value ("added insurance") for assuring a high functioning reliability.

A minimum value (that must be met) for the preset value can be derived with the use of legal ordinances or guidelines. In the first closing process (no closing path that has been determined in this way is available yet), the preset value for the opening path can be predetermined empirically with the use of the drive-specific properties of the closing device. The frequency or repetition rate of this first adaptation step can be determined as a function of the field of application and the behavior of the closing device or the drive; for example, the first adaptation step and thus the updating of the preset value for the opening path can be performed once, multiple times or for each closing process. To determine the two closing-path-dependent positions (position references) necessary for the first adaptation step, specifically the initial point in the closing direction (point of the reversal of the direction of rotation), on the one hand, and the starting point of stationary operation, on the other hand, the (closing-path-dependent) course of at least one motor variable is evaluated. The motor current, the armature duration, the power consumption, the energy consumption, the outgoing power or the outgoing torque of the electric motor can be used as a motor variable to be evaluated or assessed.

In a further adaptation step of the adaptation process for adaptive adaptation of the opening path, the properties of the closing device, particularly the properties of the closing-device drive, can be considered, and the preset values for the opening path traversed in the opening direction are correspondingly corrected. With this correction, the offset value provided for added insurance can be either completely or partially omitted. The determined (and possibly stored) value of the drive play (the "play value") of the closing device is preferably considered for the preset value for the opening path that will be traversed during the next closing process; in particular, the determined play value is set equal to the play compensation (the resulting play value) occurring in the reversal of the direction of rotation of the drive (the transition from the movement in the opening direction to the movement in the closing direction) in each closing process.

The preset value for the opening path is varied depending on whether a compensation of the drive play (a play compensation) must occur in the opening direction during the current closing process in the starting phase, i.e., whether a play compensation was effected at the beginning of the (always-occurring) movement in the opening direction: In a closing process involving a play compensation in the opening direction, a play compensation is effected (with a play value assumed to be of equal magnitude) both upon the initiation of the movement in the opening direction and during the reversal of the direction of rotation of the drive, so the preset value (containing the play compensation during the reversal of the direction of rotation) is properly selected for the opening path; in contrast, in a closing process without a play compensation in the opening direction, a play compensation is only effected during the reversal of the direction of rotation of the drive, so the preset value (containing the play compensation during the reversal of the direction of rotation) for the opening path is actually selected to be too large, and therefore can be reduced by the play value (value of the drive play). The frequency or repetition rate of the further adaptation step (especially the determination of the play value and the consideration of the play value for the preset value for the opening path) can be determined depending on the field of application and the behavior of the closing device or the drive; for example, this further adaptation step can be performed once, multiple times or for each closing process. In particular, in the consideration of the influence variable "mechanical play of the drive" (drive play), the determined play value is preferably used for presetting the opening path in each closing process, whereas a low repetition rate suffices for the determination of the play value itself (or an update thereof), because in most applications, the mechanical drive play of the closing device only changes very slowly, and ultimately only the long-term behavior is significant.

The presence of a play compensation in the opening direction (and the associated effect on the preset value for the opening path) is preferably determined with the use of the (last) actuation process of the closing device preceding the current closing process (i.e., with the use of the actuation direction of the actuating process performed immediately prior to the closing process, or with the use of the movement in the opening direction immediately prior to the movement in the closing direction). Consequently, in the presetting of the opening path, it is considered whether an opening process or a closing process was performed as the last actuation process, or whether a reversal of the direction of rotation was effected prior to the movement in the opening direction. If a closing process was performed as the last actuation process (reversal of the direction of the drive prior to the movement in the opening direction), in most cases it can be concluded that a play compensation has been effected in the opening direction, and the preset value for the opening path is not changed. If an opening process was performed as the last actuation process (no reversal of the direction of rotation of the drive prior to the movement in the opening direction), no play compensation is present in the opening direction, and the preset value for the opening path is reduced by the play value. The determination of the direction of the last actuation process, or the recognition of a reversal in the direction of rotation of the drive prior to the movement in the opening direction, can be effected, for example, through an evaluation of the switch setting of the switch provided for presetting the closing direction, or with the aid of a numerical value that characterizes the current relative position of the part moved by an electric motor (e.g. with the count, generated by means of Hall sensors, of a counter that is incremented or decremented depending on the position of the electric-motor part).

The play value is determined through a comparison of the closing paths during a closing process with a reversal of the direction of rotation of the drive (i.e., during a closing process following an opening process), and during a closing process without a previous reversal of the direction of rotation of the drive (i.e., during a closing process following a closing process), with the evaluation of position-based differences between these closing paths. To this end, the entire traversed closing path from the point of the reversal of the direction of rotation (from the initial point in the closing direction) to the starting point (attainment) of stationary operation (the play value results from the difference between these closing-path differences), or a comparison of the closing paths with one or more characteristic points in the closing-path-dependent course of the motor variable (for example, a comparison of the closing paths at the beginning of the frictional-lockup phase of the drive or a comparison of the closing paths at the starting point of stationary operation).

The determined play value can additionally be optionally validated with a plausibility consideration using the closing-path-dependent course of at least one motor variable the additionally (optionally) performed plausibility consideration for the presence of a mechanical drive play is effected, particularly in applications or occurrences in which the mechanical drive play can be influenced independently of the last actuation process (particularly independently of the direction of movement of the last actuation process), for example by an additionally-provided manual adjustment of the closing device or through external acceleration influences on the moved parts of the drive; for this purpose, the closing-path-dependent course of at least one motor variable (e.g. the motor current and/or the motor rpm), which has been determined after the opening path has been traversed and the direction of rotation has been reversed, is analyzed on the basis of plausibility criteria, particularly through a comparison of the extreme value of the motor variable (for example, the minimum of the motor current and/or the maximum of the motor rpm) with a (long-time-filtered) extreme value (for example, in an analysis of the closing-path-dependent course of the motor current as a motor variable, the no-load current in the no-load phase of the armature must fall below a drive-specific level for a defined time period) that is determined over a plurality of closing processes. If the plausibility consideration is negative (if no mechanical drive play is present), the determined play value is not considered (and especially not stored), that is, the play value is not updated.

With the described method, it is advantageously possible to:

detect an incidence of jamming in all phases of the closing process with high reliability, while adhering to all ordinances, so the method assures an effective jamming protection and thus great safety;

keep the motion in the opening direction, and thus the opening path, prior to the closing process as small as possible, so a lower-risk closing process can be realized without a sacrifice of operator comfort;

attain extensive independence of the mostly-variable supply voltage of the drive of the closing device through the selection of a position reference in the analysis of the startup phase; and reduce the safety factor for presetting the opening path, i.e., the opening path is reduced to the necessary measure during closing processes without a previous reversal in the direction of rotation, in a consideration of the properties of the closing device, especially in an evaluation of the drive play (and therefore in a consideration of signs of aging in the drive).

BRIEF DESCRIPTION OF THE DRAWINGS

The method is described below in connection with the drawings (FIGS. 1 and 2) by way of the example of the power-window drive of a motor vehicle, which is moved by an electric motor, with the use of the motor current as a motor variable. Shown are in.

DETAILED DESCRIPTION

Figure 1:
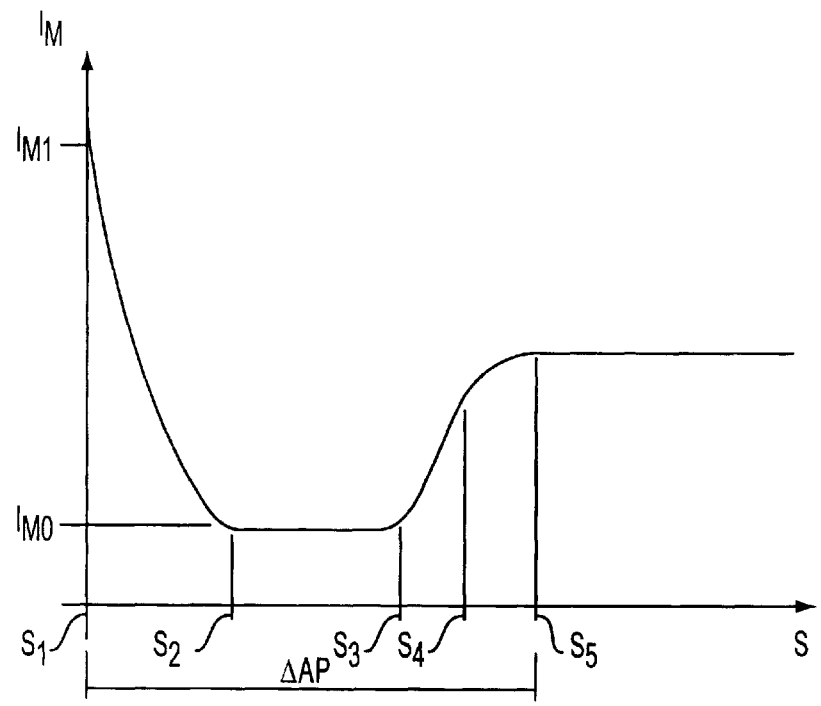
FIG. 1 the closing-path-dependent course of the motor variable of the motor current $I_M$ in the startup phase of a closing process with a play compensation.
Figure 2:
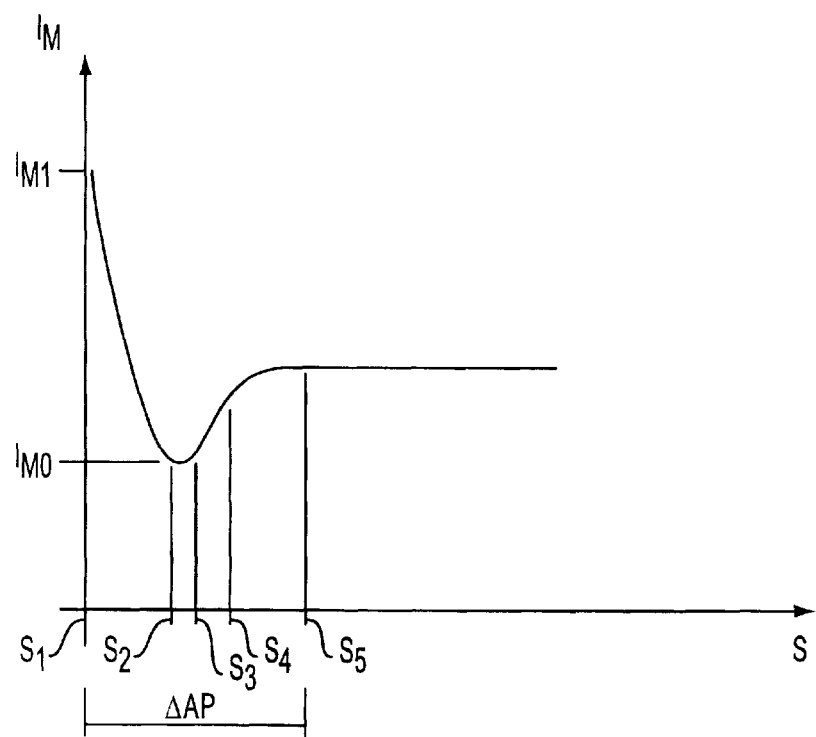
FIG. 2 the closing-path-dependent course of the motor variable of the motor current $I_M$ in the startup phase of a closing process without a play compensation.

According to FIGS. 1 and 2, which show the (closing-path-dependent) course of the motor current $I_M$ over a relatively-defined position of the closing path s, which is formed, for example, from the number of armature rotations, the startup phase of the closing path or the startup behavior of the power-window drive is characterized by the following events:

The power-window drive is activated after a closing command for the windows of the motor vehicle has been preset (initialization of the closing process). In a startup phase of the closing process with a play compensation (FIG. 1), first the drive play of the motor/gear arrangement is compensated. The electric motor is already rotating during this play compensation, with a relatively-low load acting on the electric motor. In a startup phase of the closing process without a play compensation (FIG. 2), that is, without a compensation of the drive play of the motor/gear arrangement (particularly in startups without a reversal of the direction of rotation), the mechanisms of the motor-vehicle doors are still prestressed by the preceding raising of the window (a so-called frictional lockup is already in effect). After this more or less pronounced play compensation, the stress of the power-window drive moved by an electric motor increases until the static-friction limit is reached, with the course of the increase in stress essentially reflecting the rigidity or elasticity of the gear mechanism and the door skin of the motor-vehicle doors. After the static-friction limit has been exceeded, the window moves and the electric motor is loaded with the virtually-constant frictional force of the motor/gear arrangement.

Consequently, according to FIGS. 1 and 2, the course of the motor current $I_M$ can be subdivided as follows in the startup phase of the closing process, that is, after the activation of the power-window drive until stationary operation is attained (window path of about 2 cm):

the rise phase with a switch-on current peak (startup-current peak) of finite height, with a closing path $s_1$ (the armature of the electric motor does not rotate yet); the amplitude of the startup-current peak (the maximum $I_{M1}$ of the motor current $I_M$) is essentially determined by the supply voltage and the internal resistance of the armature;

an acceleration phase of the armature between the closing paths $s_1$ and $s_2$, in which the play of the power-window drive (gear arrangement, raising mechanism) is partially compensated; the current gradient or the present motor-current closing-path rate $dI_M/ds$ is essentially determined by the mass moment of inertia of the armature of the electric motor during the current drop (the falling flank), and the minimum $I_{M0}$ of the motor current $I_M$ with a closing path $s_2$ is determined by the sliding friction of the motor/gear arrangement in a first approximation;

a no-load phase of the armature between the closing paths $s_2$ and $s_3$, in which the drive play is completely compensated (minimum $I_{M0}$ of the motor current $I_M$); according to FIG. 2, this no-load phase is only slightly pronounced in the startup phase of the closing process without a play compensation;

a frictional-lockup phase between the closing paths $s_3$ and $s_4$, in which the buildup of force occurs between the gear arrangement and the drive load, and in which the motor-vehichle doors (the door mechanisms, particularly the door rod assembly and the door skin) are deformed, as a function of their rigidity, with a certain deformation force, so the electric motor partially works counter to a spring having a progressive spring constant; the initial-breakaway torque of the window is reached in the closing path $s_4$;

an acceleration phase of the drive load between the closing paths $s_4$ and $s_5$; the window begins to move after the initial-breakaway torque is attained, with different curve courses being possible as a function of the sluggishness of the power-window drive (especially weather- and aging-stipulated influences on the window);

stationary operation (the jamming-protection function should be activated here) begins in the closing path $s_5$; the motor current $I_M$ is constant, that is, the window moves at a constant speed.

FIG. 3 illustrates the flow chart of the operational steps, which are further described in detail below, for a method of controlling the closing process of a closing device in accordance with the present invention to avoid the incidence of jamming.

Because dynamic changes in the drive load are effective with a large amplitude in the startup phase of the closing process, to assure an effective jamming protection in the startup phase following the activation of the closing process, first the power-window drive is moved in the opening direction, and a variable opening path for the window is preset by means of an adaptation process with the use of the closing-path-dependent course of at least one motor variable (e.g. the motor current $I_M$):

In a first adaptation step of the adaptation process, it is determined which change in armature position $\Delta AP$ is traversed, after the direction of rotation of the drive has been reversed during the closing process, from the switch-on current peak (closing path $s_1$) until stationary operation (closing path $s_5$) has been attained. This value of the change in armature position $\Delta AP$ is used, in conjunction with added insurance (offset value), as a preset value for the opening path during the next closing process. The start of stationary operation is defined with the use of the present motor-current closing-path rate $dI_M/ds$ such that this rate must fall below a drive-specific limit value (after the presence of a drive-specific, plausible present motor-current closing-path rate $dI_M/ds$ with a positive operational sign in the frictional-lockup phase).

In a second adaptation step, the preset value for the opening path is varied as a function of the system properties of the closing device. In particular, the preset value for the opening path is varied depending on the startup behavior of the closing device, with consideration of the mechanical drive play of the closing device. In this consideration of the drive play (the play value of the drive value), it is determined whether the direction of rotation of the drive has been reversed prior to the beginning of the movement in the opening direction preceding the movement in the closing direction. With a movement in the opening direction without a prior reversal of the direction of rotation of the drive, that is, with an opening process as the last actuation process (no play compensation can occur here), the preset value for the opening path is reduced by the play value.

The play value is determined (either by means of separate measurements or within the scope of "normal" closing processes) through a comparison of the startup characteristics for the closing process, with and without a previous reversal of the direction of rotation of the drive, and from the resulting, position-based differentiation of the closing-path-dependent course of the motor current in the startup phase, for example through the comparison (difference formation) of the values of the relative change in armature position $\Delta AP$, or through the comparison (difference formation) of the closing paths $s_3$ at the beginning of the frictional-lockup phase (this beginning is determined, for example, when the positive motor-current closing-path rate $dI_M/ds$ exceeds a certain, drive-specific limit value).

The play value determined in this way can be validated, for example, with the level of the no-load current (the minimum $I_{M0}$ of the motor current $I_M$) in the no-load phase of the armature between the closing paths $s_2$ and $s_3$: Mechanical play is only present if the no-load current (the minimum $I_{M0}$ of the motor current $I_M$) falls below a drive-specific level for a defined time period, and/or if the level of the no-load current is smaller by a drive-specific amount than the minimum $I_{M0}$ of the motor current $I_M$ in a startup phase without mechanical play. If the validation is negative (presence of an "apparent" play caused by a pothole, for example), the determined play value is not considered.

Analogously, the observations performed for the motor current as a motor variable, by way of example, can be transferred to (one or more) other motor variables; for example, the closing-path-dependent or position-dependent course of the motor variables of armature period, power consumption, energy consumption, outgoing power or outgoing torque can be evaluated or assessed.

What is claimed is:

1. A method of controlling the closing process of a closing device for assuring jamming protection, wherein the closing device has at least one part that is moved by an electric motor in an opening direction or a closing direction, the method comprising the steps of:
  a) performing a movement in the opening direction with a specific opening path after an activation of the closing process, wherein the opening path is variably preset by means of an adaptation process involving at least one adaptation step; and wherein the opening path is varied at least as a function of a preceding actuation process of the closing device; and
  b) performing a movement in the closing direction after the movement in the opening direction.

2. The method according to claim 1, wherein the at least one adaptation step includes traversing a closing path in the closing direction until a stationary operation of the closing device is attained during a previous closing process, and wherein the closing path traversed is preset as the opening path of a subsequent closing process.

3. The method according to claim 2, wherein the closing path traversed in the closing direction is determined by means of an absolute or incremental position detection.

4. The method according to one of claim 1, wherein a minimum value is preset for the opening path based on specified guidelines to be fulfilled.

5. The method according to one of claim 1, wherein the opening path is acted upon with an additive offset value as added insurance.

6. The method according to one of claim 1, wherein the opening path is varied as a function of at least one system property of the closing device.

7. The method according to claim 6, wherein the at least one system property of the closing device includes a startup behavior of the closing device.

8. The method according to claim 7, wherein the at least one system property of the closing device includes a determined play value of the mechanical drive play of the closing device.

9. The method according to claim 8, wherein the determined play value is set equal to a compensation of the mechanical drive play during a transition from a movement in the opening direction to a movement in the closing direction.

10. The method according to claim 9, wherein in a movement in the opening direction without a compensation of the mechanical drive play, the opening path is reduced by the determined play value.

11. The method according to claim 10, wherein the presence of a compensation of the mechanical drive play is determined with the direction of movement of an actuation process of the closing device that precedes a subsequent closing process.

12. The method according to claim 11, wherein the direction of movement of the actuation process preceding the subsequent closing process is determined by means of position counters.

13. The method according to claim 11, wherein the direction of movement of the actuation process preceding the subsequent closing process is determined through an evaluation of a switch position of an actuation switch.

14. The method according to one of claims 8, wherein the play value is determined through a comparison of a closing-path-dependent course of at least one motor variable of the electric motor during a closing process with a preceding closing process, and in a closing process with a preceding opening process.

15. The method according to claim 14, wherein the play value is determined through a comparison of the closing paths traversed until the attainment of a characteristic point in the closing-path-dependent course of the at least one motor variable of the electric motor.

16. The method according to one of claims 8 wherein for the determined play value, a plausibility check is performed with the closing-path-dependent course of at least one motor variable.

17. The method according to claim 16, wherein the plausibility check is performed with the use of an extreme value of the at least one motor variable.

18. The method according to one of claim 14, wherein at least the motor current is used as a motor variable.

* * * * *